May 30, 1972  R. S. ISNOR  3,666,499
CORN POPPER

Filed Jan. 14, 1966  2 Sheets-Sheet 1

INVENTOR
RUSSELL S. ISNOR

BY

GEORGE R. CLARK ATTY.

May 30, 1972   R. S. ISNOR   3,666,499
CORN POPPER

Filed Jan. 14, 1966   2 Sheets-Sheet 2

INVENTOR
RUSSELL S. ISNOR

BY GEORGE R. CLARK ATTY.

United States Patent Office 3,666,499
Patented May 30, 1972

3,666,499
CORN POPPER
Russell S. Isnor, Wheaton, Ill., assignor to
Sunbeam Corporation, Chicago, Ill.
Filed Jan. 14, 1966, Ser. No. 520,694
Int. Cl. A23l 1/18
U.S. Cl. 99—238.1                                    3 Claims

ABSTRACT OF THE DISCLOSURE

A corn popping appliance having a vessel portion and a cover which cooperate to form an enclosure in which corn may be popped. When the cover is inverted, it forms a receptacle of sufficient volume to use as a serving dish for the popped corn. Cooperating means on the cover and vessel portion retain them in assembled condition so that they may be inverted from the cooking to the serving position.

---

The present invention relates generally to a corn popper and more particularly to an improved corn popper including means for storing and serving the popped corn.

In recent years popped corn has become increasingly popular with the people in this country. Popped corn is a food product resulting from heating at high temperature kernels of a particular type of corn. The moisture in the cellular center of the kernel explodes, breaking the shell structure and producing a large light food particle which is known as popped corn. Cooking oil is conventionally used to heat the corn kernels uniformly.

For many years popped corn has been produced in more or less makeshift cooking utensils. And adequate job of popping corn can be performed by merely using a heavy metal cooking vessel which may be heated on a stove. Because of the lack of thermostatic control in such an arrangement considerable attention is required of the operator to prevent the popped corn from burning. As a consequence, there have appeared on the market appliances designed solely for the popping of corn. These appliances have self contained heating units and frequently include thermostatic controls or stirring means to lessen the possibility of burning the popping corn.

These units have taken the form of a fairly deep cup-shaped vessel having a heating element secured to the bottom and provided with a lid for the open top. It is necessary for the vessel to be quite large since the corn expands substantially in the popping process. It is estimated that under normal conditions the popped corn will occupy 18 to 24 times the volume of the unpopped corn. Thus, it is conventional for such a corn popper to have a capacity of three or four quarts.

To cause the corn to pop it is necessary to bring the corn to a temperature of between 350° and 400° Fahrenheit. Because of the high temperature required for the cooking of the corn, it is necessary to remove the popped corn from the cooking vessel soon after it has been popped or burning will result. Thus, the person using one of the present day electric corn poppers places the necessary cooking oil in the unit, heats it up to temperature, adds the corn to the unit and a few minutes later when the corn is popped, it must be poured into a second container of suitable capacity. This process requires the operator to have two fairly large capacity vessels available as soon as the popping of the corn is completed. There must be the corn popper itself as well as the serving receptacle into which the cooked corn is to be placed. Accordingly, it would be more simple and expeditious if the vessel in which the corn is popped could also be used as a serving vessel.

It is an object of the present invention to provide a culinary utensil for popping corn which includes, as an integral part thereof, a receptacle for serving the cooked popcorn.

It is a further object of the present invention to provide a corn popper having an enlarged cover which may act as a serving utensil for the cooked popcorn.

It is another object of the invention to provide a culinary utensil for cooking popcorn in which the enclosure for cooking the corn is formed, in part, by a large serving vessel.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

FIG. 1 shows the complete corn popper;

FIG. 3 shows the complete corn popper.

Figure 2:
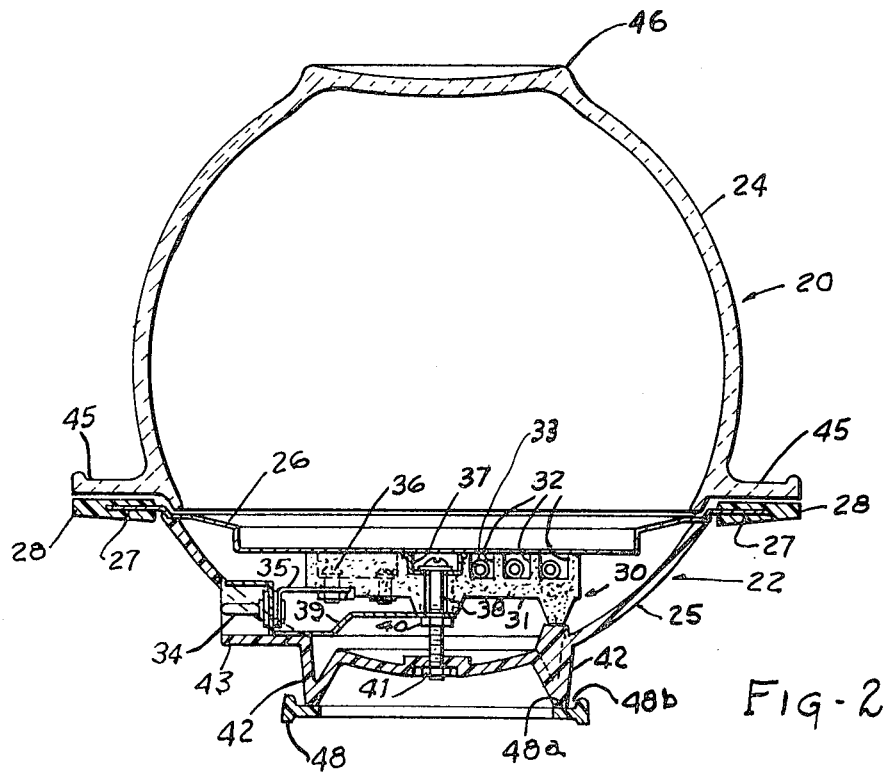
FIG. 2 is a sectional view taken on line 2—2 of FIG. 1 assuming

Briefly, the present invention is concerned with an electric corn popper having a shallow receptacle in which the corn is placed for cooking and including a large domelike cover which cooperates with the shallow receptacle to form a cooking chamber. The receptacle and its cover are designed so that when the corn has been completely cooked, the assembly may be inverted whereby the domelike cover acts as a receptacle in which the popped corn may be served.

Referring now to the drawings, there is illustrated a corn popper 20 which includes a lower vessel portion 22 and a domelike cover 24. The lower vessel portion 22 includes an outer plastic housing 25 and a shallow receptacle 26. The receptacle 26 is generally round and cup-shaped and includes a pair of integrally formed handle projections 27 to which are molded plastic handles 28. The handles 28 are positioned diametrically opposite each other extending outwardly from the receptacle 26 thereby providing thermally insulated means for lifting the lower vessel portion 22.

Secured to the underside of the receptacle 26 is a heating element assembly 30. This assembly is made up of a ceramic member 31 having concentric grooves 32 formed in the upper face thereof. Received within the grooves 32 are coils 33 of resistance wire. The ends of the coils are interconnected to form a single continuous element. The coils 33 are stretched so as to engage the inside of the grooves 32 and thereby retain the coils in a fixed position within the grooves. To connect the ends of the resistance wire 33 to a suitable power source, there are provided terminals 34, one of which is visible in FIG. 2. The terminals 34 are connected by bus leads 35 and bolts 36 to the ends of the resistance coils 33.

For the purpose of securing the heating element assembly 30 to the bottom of the receptacle 26, there is provided a U-shaped bracket 37 which is spot welded to the bottom of the receptacle 26. An assembly bolt 38 extends downwardly from the bracket 37 through an opening in the terminal support 39. A nut 40 threadedly received on the bolt 38 clamps the terminal support 39 against the heating element assembly 30 and retains the entire structure against the bottom of the receptacle 26. A second assembly nut 41 engages the bottom of the plastic housing 25 completing the assembly of the lower vessel portion 22.

The plastic housing 25 is formed with an annular supporting flange 42 which extends downwardly at the base of the vessel portion 22. In addition, the housing 25 is formed with a terminal shield 43 which extends outwardly to the ends of the terminals 34. A suitable plug connector may be inserted into the receptacle formed by the terminal shield 43 and the terminal support 39. When the terminals 34 are connected to a suitable source of power, the heating assembly 30 is energized to heat the shallow receptacle 26. The receptacle 26 need only be of sufficient depth to contain a one-half cup of popcorn and a few tablespoons of cooking oil or grease.

The domelike cover 24, on the other hand, has sufficient volumetric capacity so that it may receive four quarts of popped corn. As the corn begins to pop under normal conditions of use, it rises above the level of the receptacle 26 and fills most of the cover 24. The cover 24 is provided with handles 45 which overlie and are similar in shape to the handles 28. The top of the domelike cover 24 is formed with an annular projecting rib 46. The annular rib 46 provides a stand for the domelike cover 24 when it is inverted from the position shown in FIG. 2.

When the corn placed in the shallow receptacle 26 has completed popping, the corn popper is grasped by the handles 28 and 45 and inverted with the vessel portion 22 and the domelike cover 24 held in assembled relation. The assembly is then rested on the annular projecting rib 46, at which time the lower vessel portion 22 is removed to permit use of the domelike cover 24 as a serving dish for the popped corn contained therein.

For the purpose of supporting either the lower vessel portion 22 or the domelike cover 24, there is provided an annular supporting ring 48. The ring 48 is made of a heat resistant plastic and is provided with a flat annular supporting surface 48a which is of suitable diameter to receive the flange 42 of the housing 25. The supporting ring 48 is also formed with an upstanding flange 48b which prevents the housing flange 42 from being displaced from the surface 48a. The ring 48 is proportioned so that it will receive on the surface 48a, the annular rib 46 on the domelike cover 24. Thus the corn popper 20 may be inverted with the cover 24 placed on the supporting ring 48, assuring that the hot glass of the cover will not damage the supporting surface.

Figure 1:
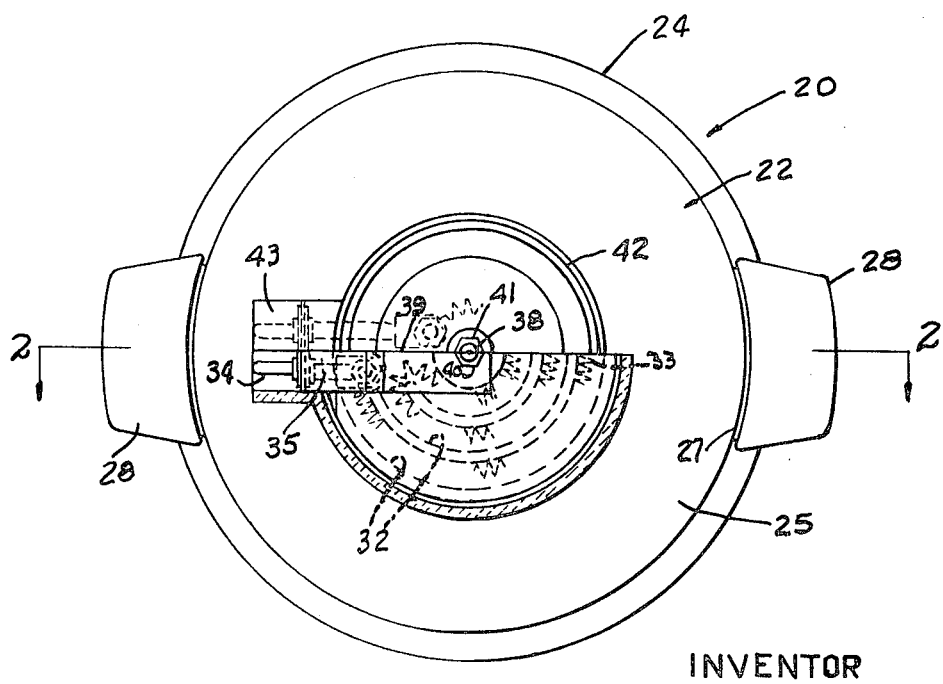
FIG. 1 is a bottom plan view of a corn popper embodying the present invention with a portion thereof cut away to expose the interior of the unit.
Figure 4:
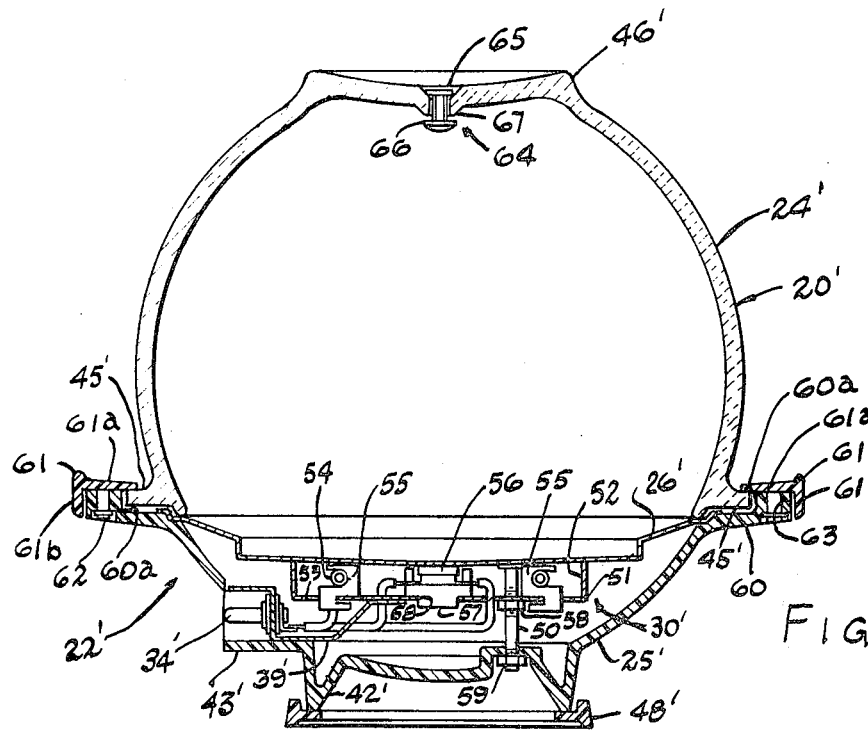
FIG. 4 is a sectional view taken on line 4—4 of FIG. 3 assuming
Figure 3:
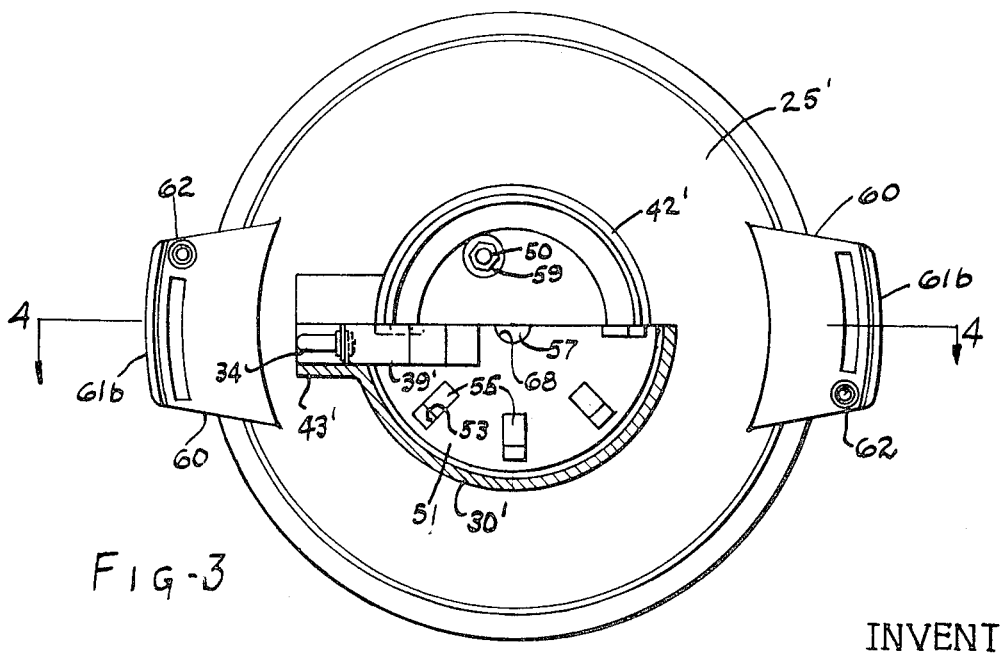
FIG. 3 is a bottom plan view of an additional embodiment of a corn popper embodying the present invention with portions cut away to expose the interior of the corn popper.

Disclosed in FIGS. 3 and 4 is a second embodiment of the invention which is similar in many respects to the embodiment of FIGS. 1 and 2. The corn popper is designated generally by the reference numeral 20'. It is made up of a lower vessel portion 22' and a domelike cover 24'. A plastic housing 25' encloses a shallow receptacle 26'. For the purpose of securing a heating element assembly 30' to the bottom of the receptacle 26' there is provided an assembly stud 50 which is welded to the bottom of receptacle 26' and extends downwardly therefrom. The heating element assembly 30' includes a shallow-dished member 51 having an upstanding flange 52 and a plurality of radially extending openings 53. A coiled resistance wire element 54 is supported in the conventional manner by a plurality of S-shaped ceramic members 55 which are received in the openings 53. The coiled resistance wire element 54 retains the ceramic members 55 in assembled relationship to the member 51 in the well-known manner. Positioned at the center of the heating element assembly 30' is a thermostatic assembly 56. The assembly 56 is formed with a downwardly projecting boss 57 which is received in an opening 68 in the plate 51.

For the purpose of retaining the heating element assembly 30' on the bottom of the receptacle 26' there is provided nut 58 which is threadedly received on the stud 50. The nut 58 clamps the member 51 against the bottom of the receptacle 26'. The thermostat 56 is trapped between the member 51 and the bottom of the receptacle 26' with the face of the thermostat in intimate contact with the bottom of the receptacle.

The corn popper 20' is also provided with a terminal support 39' which extends downwardly and laterally from the member 51. A pair of insulated electrical terminals 34' are carried by the support 39' and suitable conductors are provided to connect the heating element 54 and the thermostat 56 in series across the terminals 34'.

The plastic housing 25' is retained against the lower face of the receptacle 26' by nuts 59 which are threadedly received on the lower end of the two assembly studs 50. The plastic housing 25' also includes integral legs 42' and terminal shield 43'. Also formed integrally with the plastic housing 25' are a pair of outwardly extending handle members 60. The handle members 60 are positioned at diametrically opposed edges of the plastic housing 25' and support thereon a pair of pivotally mounted retaining members 61. The retaining members are somewhat L-shaped in cross section as may be seen in FIG. 4 and include horizontal portions 61a and downwardly extending flange portions 61b. At one end of each of the retaining members there is provided a downwardly extending pivot member 62 which extends through an opening 63 in the handle 60. The pivot member 62 provides means whereby the retaining member may be rotated outwardly from its position overlying the outer end of the handle 60.

The domelike cover 24' is formed with outwardly extending handle portions 45' which are received in recesses 60 formed in the inner edges of the handles 60. With the handles 45' received in the recesses 60a, the portions 61a of the retaining members overlie the handles 45'. With the retaining members thus positioned, the corn popper 20' may be inverted from the position shown in FIG. 4 with the lower vessel portion 22' and the domelike cover 24' being retained together as a single unit. Thus after the corn has been popped with the unit in the position shown in FIG. 4, it is then inverted so that the annular projecting rib 46' on the domelike cover 24' rests on the supporting ring 48'. The lower vessel portion 22' may then be removed from the domelike cover 24' by pivoting the retaining members 61 90° outwardly from their positions overlying the handles 45'. When this has been accomplished, the lower vessel portion 22' may be lifted out of contact with the domelike cover 24' thereby exposing the cooked popcorn contained therein.

Another aspect wherein the embodiment of FIGS. 3 and 4 differs from the embodiments of FIGS. 1 and 2 is the addition of a moisture vent 64. The vent 64 includes a movable valve member 65 received within an opening 66 in the domelike cover 24'. As corn is popped, moisture is released which must be dissipated. In the embodiment of FIG. 1 the moisture is simply passed off between the lower vessel portion of the domelike cover portion. On the chance that there may not be sufficient clearance between these parts to provide adequate vents, it is desirable to include a separate vent such as 64. The moisture will displace the valve member 65 upwardly and permit moisture to pass through the opening 66. An important aspect of the vent 64 is that a sloping portion 67 surrounds the opening 66. When the domelike cover 24' is used as a receptacle for popcorn, there will frequently be excessive amounts of butter which will drip to the bottom of the cover. The upwardly angled surface 67 surrounding the opening 66 prevents the butter from passing outwardly through the valve member 65.

The two embodiments of the invention described above provide a very practical means for cooking and serving popcorn and, as such, represent a considerable advance over the corn poppers heretofore known in the art. While there has been illustrated and described only two embodiments of the invention, it will be readily understood by those skilled in the art that numerous changes and modifications can be made without departing from the present invention.

What is claimed as new and desired to be secured by Letters Patent of the United States is:

1. A corn popper comprising a shallow cooking vessel for receiving popping corn and cooking oil in which said corn is popped, electric heating means mounted in heat exchange relation with the exterior of said vessel, housing and stand means for supporting said vessel in an upright position, said housing and stands means being connected to said vessel insulating said heating means from a surface on which said popper is supported, an enlarged cover for said vessel having a mouth defined by the downwardly extending walls thereof, said cover being supported with said mouth superimposed over said vessel and forming with said vessel an enclosure for popping corn said cover having a volume substantially greater than the volume of said vessel, handle means for retaining said vessel and cover in assembled relation and for inverting said vessel and cover as a unit, said cover having a stand permitting it to rest in an inverted position whereby the cover serves as a container and the vessel serves as a cover, said handle means including a pair of diametrically disposed outwardly extending handles on both said housing and said cover, said cover handles being positionable in open recesses in said housing handles when said cover mouth is superimposed over and housing, said housing handles being of heat insulating material, locking members of heat insulating material pivotally connected to said housing handles and movable between a position in which said cover handles are exposed in said recesses to permit removal of said cover from said housing and a position in which said locking members overlie said cover handles to retain said cover and housing in assembled relation and to guard said cover handles from engagement with the hand of the user.

2. The corn popper of claim 1 wherein said cover includes a vent means in the top thereof, valve means for controlling said vent means, said valve having a gravity actuated member which is unseated by escaping vapor when said cover is on top of said vessel, said valve being closed by gravity when said cover is inverted, said vent means is formed with an inner upstanding flange on said top of said cover which prevents liquid from entering said valve means when said cover is inverted.

3. The corn popper of claim 1 wherein said vessel stand means and cover stand comprise annular flanges of substantially the same diameter and a thermally insulating ring for receiving and supporting said vessel and said cover on said annular flanges.

References Cited

UNITED STATES PATENTS

| | | | |
|---|---|---|---|
| 1,642,531 | 9/1927 | Barnard | 99—238.1 UX |
| 1,974,360 | 9/1934 | Kimmel | 219—441 |
| 1,992,843 | 2/1935 | Serenberg et al. | 219—472 X |
| 2,364,125 | 12/1944 | Bruening | 220—4 |
| 2,522,085 | 9/1950 | Beckemeyer et al. | 99—238.1 X |
| 2,614,722 | 10/1952 | Wyman | 220—40 |
| 2,641,911 | 6/1953 | Raymond et al. | 248—346.1 |
| 2,650,736 | 9/1953 | Curry | 99—238.1 UX |
| 2,659,222 | 11/1953 | Meier | 220—4 UX |
| 2,923,803 | 2/1960 | Kueser | 99—238.1 X |
| 3,611,910 | 10/1971 | Hughes | 9—238.1 |

FOREIGN PATENTS

| | | | |
|---|---|---|---|
| 486,792 | 11/1953 | Italy | 220—4 |
| 882,895 | 11/1961 | Great Britain | 220—55 |

BILLY J. WILHITE, Primary Examiner

U.S. Cl. X.R.

220—4 R, 40 S, 55 G